June 6, 1967    G. STAVIS    3,324,238
STEREOSCOPIC TERRAIN DISPLAY USING TELEVISION COMPONENTS
Filed Feb. 10, 1964    2 Sheets-Sheet 2
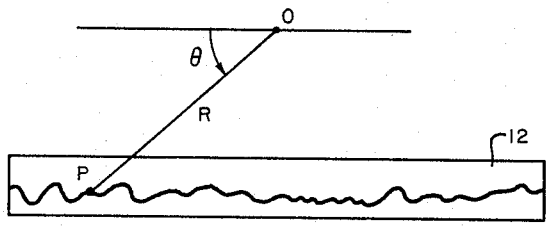
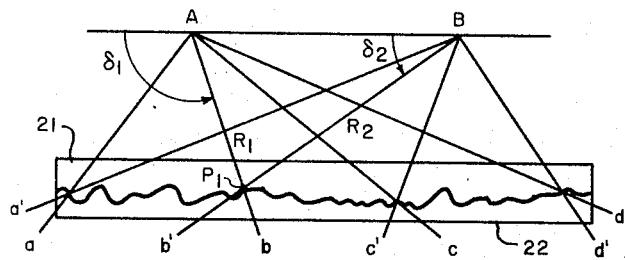
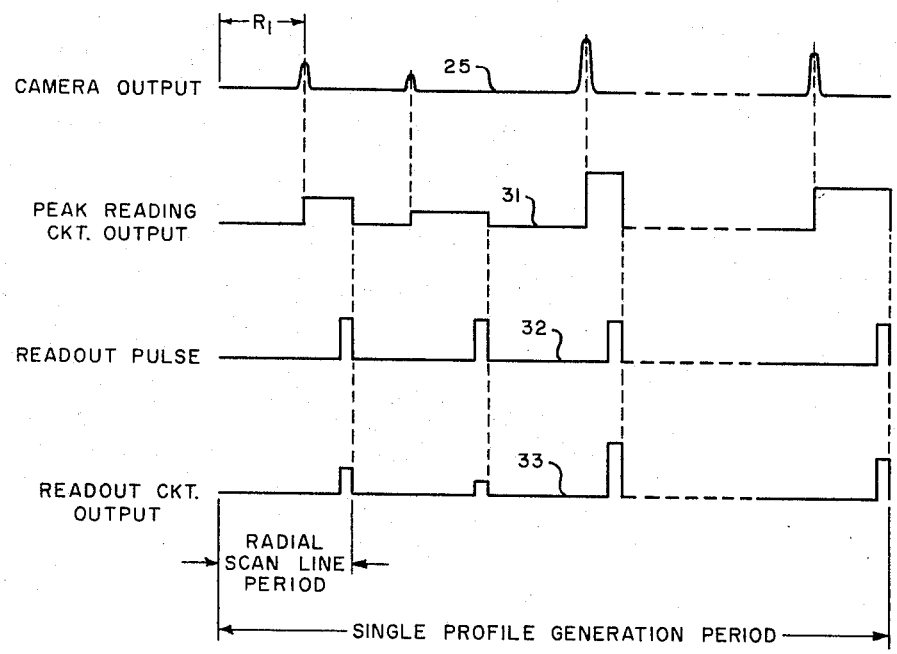
INVENTOR.
GUS STAVIS
BY
ATTORNEY.

3,324,238
STEREOSCOPIC TERRAIN DISPLAY USING
TELEVISION COMPONENTS
Gus Stavis, Briarcliff Manor, N.Y., assignor to General
Precision, Inc., a corporation of Delaware
Filed Feb. 10, 1964, Ser. No. 343,630
4 Claims. (Cl. 178—6.5)

This invention relates generally to stereoscopic viewing techniques and particularly to apparatus for viewing simultaneously and stereoscopically a number of line images which are generated sequentially.

It is believed that the invention will find its principal application in the viewing of images of profiles of terrain which are generated sequentially by apparatus carried by an aircraft flying over the terrain which it is desired to view. Accordingly, the invention will be described as applied to such use.

Various kinds of airborne equipment have been proposed to gather data for map making. In addition to direct aerial photography, it has been proposed to scan successive strips of terrain by a source of electromagnetic wave energy carried by an aircraft. The energy may be in the microwave, infrared or visible portions of the spectrum. A number of arrangements utilize lasers as the source because lasers are capable of generating very narrow beams. Both pulsed and continuous wave systems have been proposed which generate successive images, each of one narrow strip of terrain beneath the aircraft. The actual display may be generated on the ends of a matrix of optical fibers or on the screen of a cathode ray tube. The present invention may be used with any arrangement which generates images of profiles one at a time.

Having generated the profiles, the question arises as how best to utilize the information. The profiles may, of course, be recorded, for example by a motion picture camera or video tape, for later analysis. There remains, however, a need for apparatus to enable a number of profiles to be viewed simultaneously, either substantially concurrently with their generation or subsequently upon playback of stored information. Furthermore, it is highly desirable to take advantage of a human observer's inherent ability to perceive an illusionary three dimensional effect.

It is a general object of the present invention to provide apparatus for viewing simultaneously a number of line images which are generated sequentially.

Another object is to provide a stereoscopic view of a plurality of line images representing the terrain beneath an aircraft.

Another object is to generate two representations, each simulating a view from a different point, of the same plurality of line images which images are generated sequentially.

Briefly stated, the plane on which the line images are generated sequentially is viewed by two television cameras. Each camera scans each line image in sequence in a generally transverse direction with a radial scan, thereby generating a series of pulses representing the intensity of each elemental area and its position in polar coordinates with respect to an origin which constitutes imaginary viewing point. The pulse output of each television camera is passed to a peak-reading circuit which eliminates the range information so that the pulse train represents intensity as a function of viewing angle. The pulse train outputs of the two peak-reading circuits, representing a number of profiles corresponding to the desired field of view, are recorded line by line on two separate groups of storage tubes. The stored information is read out at a convenient rate and displayed on two cathode ray tubes. Thus two images are formed representing the same area as seen from two points of view. A stereoscopic viewer enables an operator to view one cathode ray tube with each eye, thereby generating a three dimensional effect.

For a clearer understanding of the invention, reference may be made to the following detailed description and the accompanying drawing, in which:

FIGURES 2, 3 and 4 are diagrams useful in explaining the invention.

Figure 1:
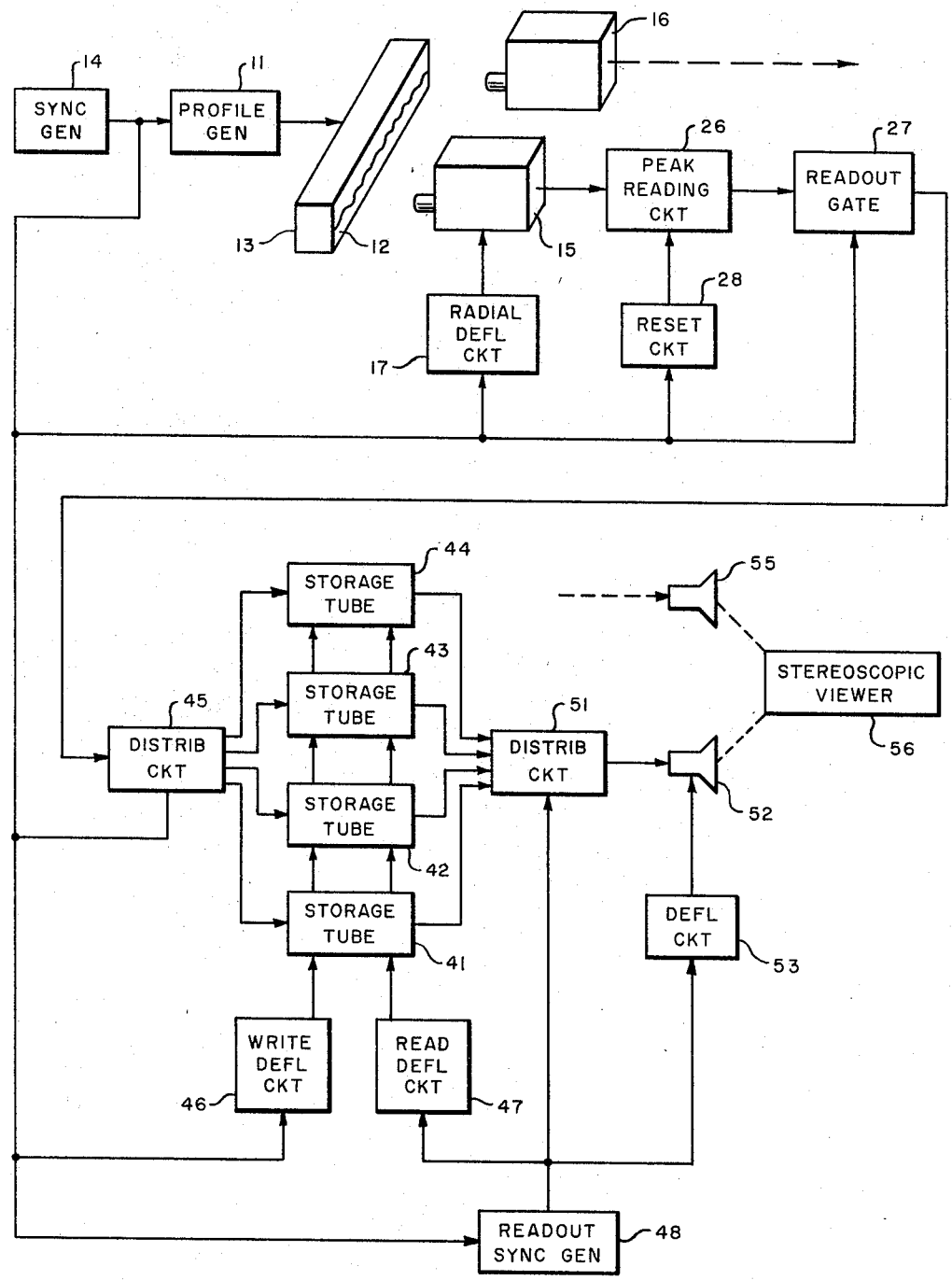
FIGURE 1 is a schematic block diagram of a preferred form of the invention.

Referring first to FIGURE 1 there is shown a profile generator 11 which may be airborne equipment which illuminates successive profiles beneath the aircraft with electromagnetic energy, receives reflections, and displays the result on an image plane 12 of a display device 13. One suitable profile generator is described in the copending application of Hayek et al., Ser. No. 342,617, filed Feb. 5, 1964, for "Optical Object Locating System," which application is assigned to the same assignee as is the instant application.

Briefly stated, the cited application describes a system in which a narrow light beam is scanned across a strip of terrain beneath an aircraft, reflections are received, intensified, and displayed on a matrix of optical fibers. Alternatively, for the purpose of the present invention, the generator 11 may be equipment which plays back previously stored information and may comprise a motion picture camera or a video tape machine with a cathode ray tube monitor. The generator 11 has associated therewith a timer or synchronizing pulse generator 14 which controls the generation of profiles. In a typical system, profiles may be generated at a rate of from 100 to 300 profiles per second although this rate is not a limitation for the operation of this instrumentation.

FIGURE 2 shows the image plane 12 and a typical profile. Each point on the profile, such as the point P, represents an elemental area of the terrain beneath the aircraft. The profile may be considered to be a polar coordinate plot of the position of each elemental area, such as the point P, with respect to the point O of the aircraft at the time the reflection was received. As shown in FIGURE 2 the point P is at a distance R from the point O and is at a depression angle $\theta$. The intensity of each point is a measure of the reflectivity of the corresponding elemental area.

Referring again to FIGURE 1, two television cameras 15 and 16 are positioned so that each forms an image of the profile on its sensitive area. Each camera is connected to a similar chain of components only one of which is shown. The camera 15 is controlled by a radial deflection circuit 17 which is in turn controlled by the generator 14. The scan lines generated by the camera 15 are of the conventional radial or spiral type such as may be employed in a P.P.I. radar system. A representation of the scan lines generated by the cameras 15 and 16 respectively are shown in FIGURE 3. Typical scan lines are $a$, $b$, $c$ and $d$ all of which originate at the point A, as if the profile were viewed from the point A. It will be understood that there are many radial scan lines of which $a$, $b$, $c$ and $d$ are typical. For example, if the profile contains 5,000 resolution elements there will be 5,000 radial scan lines. These are all generated during the time required to generate one profile. If the profiles are generated at a rate of 100 per second and if there are 5,000 resolution elements per profile the frequency of the scan lines will be 500 kc. It is not necessary that the entire lines $a$, $b$, $c$ and $d$, etc. be generated, it only being necessary that that portion between the horizontal lines 21 and 22 be actually generated. These lines correspond to the maximum and minimum elevations expected in the terrain being mapped.

The output of the camera 15 is a series of pulses each occurring when a scan line intersects the profile. Considering the scan line $b$ it is apparent that the pulse generated by that scan line is due to a point, such as the point $P_1$, at a depression angle of $\delta_1$. Also, the time of occurrence during the scan line is indicative of the range of $R_1$ of the point $P_1$ from the point A. Furthermore, the intensity is a measure of the reflectivity of the corresponding elemental area. In other words the series of pulses generated by the camera 15 contains information regarding range, bearing and intensity for each elemental area of the profile. Such a series of pulses is illustrated by the curve 25 of FIGURE 4.

The camera 16 similarly scans its image of the profile with a series of radial scan lines originating at the point B of FIGURE 3. The point $P_1$ is at a range $R_2$ and a depression angle $\delta_2$ from the point B.

When a person views any scene his eye receives information as to bearing and intensity but not as to range. Range information is synthesized or estimated by the brain. Accordingly, for display purposes range information is not required. The output of the camera 15 is connected to a peak reading circuit 26 which is read out and reset at the end of each radial scan line. Such circuits are well known and usually comprise a capacitor charged to the potential of the input and discharged at the end of each defined period. Such circuits are sometimes called "box car" circuits. The peak potential of each pulse is sampled at the end of each scan line by a readout circuit 27 after which the circuit 26 is reset by a circuit 28.

The operation of this circuit is illustrated in FIGURE 4. The pulses from the camera are shown by the curve 25. The potential at the output of the peak reading circuit 26 is shown by the curve 31. The readout pulses shown by the curve 32 determine the time at which the output of the circuit 31 is sampled. The resulting pulses, that is the output of the readout circuit 27, are shown by the curve 33. Each pulse of the curve 33 thus represents by its time of occurrence (the radial scan line in which it occurs) the bearing, and by its amplitude, the intensity or reflectivity.

The bearing and intensity of each point comprise the information necessary to form a visual display. It is required to display a series of profiles line by line on a screen such as that of a cathode ray tube. But in order to display a meaningful number of profiles at the rate of occurrence of the pulses at the output of the circuit 27 takes a considerable time. For example, suppose each profile represents a strip of terrain five feet wide and suppose it is desired to display an area one mile wide. This would require the simultaneous display of approximately 1,000 profiles which would require ten seconds to generate. It would be possible to use a cathode ray tube with a very long persistence screen, but such screens cause smearing and loss of detail. It is therefore preferred to store the information before displaying it.

The output of the readout circuit 27 is connected to a storage device which stores the profiles line by line at the rate of occurrence of the pulses and reads them out at a convenient rate so that they may be displayed. The currently available storage tubes may have insufficient resolution to store all the information available on a single tube and accordingly several may be required. The actual number required will depend upon the number of resolution elements in each profile, the number of profiles to be displayed, the rate of occurrence and the capabilities of the storage tubes. By way of example in FIGURE 1 there are shown four storage tubes 41, 42, 43 and 44 which may be any of several commercially available tubes. One satisfactory tube may be obtained from the Raytheon Company of Waltham, Mass., and is designated model CK7702. The output of the readout circuit 27 is connected to a distribution circuit 45, controlled by the generator 14 which distributes the pulses to the storage tubes 41, 42, 43 and 44 successively. These tubes record the pulse information under the control of a deflection circuit 46 which in turn is synchronized by pulses from the generator 14. The stored information is read out of the storage tubes under control of the deflection circuit 47 which is synchronized by a synchronizing pulse generator 48. The generator 48 also controls a distribution circuit 51 which assembles the information from the storage tubes and applies it to a cathode ray tube 52. The tube 52 is controlled by a deflection circuit 53 which is in turn controlled by the generator 48. It is preferred, but not necessary, that the generator 48 be synchronized by the generator 14.

Thus it is apparent that there is developed on the screen of the tube 52 a display of a series of projections of the profiles as if viewed from the point A of FIGURE 3. A similar chain of components (not shown) is connected to the camera 16 which forms a similar display on a cathode ray tube 55 as if viewed from the point B of FIGURE 3. A stereoscopic viewer 56 enables an operator to view one of the tubes 52 and 55 with each eye, thereby obtaining a stereoscopic view of an area of terrain beneath the aircraft.

Although a specific embodiment of the invention has been described for illustrative purposes many modifications will occur to those skilled in the art. It is therefore desired that the protection afforded by Letters Patent be limited only by the true scope of the appended claims.

What is claimed is:

1. The combination of apparatus for generating a pair of stereoscopically related images of a terrain area from a series of reflectivity information containing profile representations of successive narrow strips of said terrain area comprising, a pair of television cameras each viewing said profile representations from a different viewpoint respectively, each of said cameras including a deflection circuit for scanning the field of view thereof in successive radial scans originating from a selected apex of the field of view, the selected originating apex of radial scan being different for each camera, and each camera further includes means for generating a series of pulses the amplitude of which represents the intensity of reflection of the profile representations at each profile point so scanned, a pair of cathode ray tubes, means interconnecting the output of each of said cameras with a respective one of said cathode ray tubes for visually displaying on said cathode ray tubes in adjacent line scans the output pulses of each series of radial scans, and means for stereoscopically viewing said cathode ray tube displays.

2. The combination of apparatus for generating a pair of stereoscopically related images of a terrain area from a series of reflectivity information containing profile representations of successive narrow strips of said terrain area comprising, a pair of television cameras each viewing said profile representations, each of said cameras including a deflection circuit for scanning the field of view thereof in successive radial scans originating from a selected apex in the field of scan, the selected originating apex of radial scan being different for each camera, and further including output means for providing a series of output pulses the time of occurrence of each of which represents the direction and distance of the profile representation from the origin of said radial scan and the amplitude of each of which represents the intensity of reflection of the corresponding profile representation, circuit means individual to each said camera for converting the output pulses of the respective camera into a series of pulses with each pulse of said series of pulses proportional in amplitude to the amplitude of the corresponding output pulse and each said pulse of said series being representative in time of occurrence only of the distance of the corresponding profile representation to the origin of the radial scan, first and second cathode ray tubes, means for interconnecting the outputs of said first and second circuit means to said first and second cathode ray tubes respectively for visually displaying on said tubes in adjacent line scans the output pulses of said circuit means, and means for stereoscopically viewing said cathode ray tube displays.

3. The combination of apparatus for generating a pair of stereoscopically related images of a terrain area from a series of reflectivity information containing profile representations of successive narrow strips of said terrain area comprising, a pair of television cameras each viewing said profile representations, each of said cameras including a deflection circuit for scanning the field of view thereof in successive radial scans originating from a selected apex in the field of scan, the selected originating apex of radial scan being different for each camera, and further including output means for providing a series of output pulses the time of occurrence of each of which represents the direction and distance of the profile representation from the origin of said radial scan and the amplitude of each of which represents the intensity of reflection of the corresponding profile representation, circuit means individual to each said camera for converting the output pulses of the respective camera into a series of pulses with each pulse of said series of pulses proportional in amplitude to the amplitude of the corresponding output pulse and each said pulse of said series being representative in time of occurrence only of the distance of the corresponding profile representation to the origin of the radial scan, first and second storage means for storing the pulse outputs of said circuit means at the rate of occurrence thereof and for reading out the stored pulses at a different rate, first and second cathode ray tubes, means interconnecting the outputs of said storage means with said cathode ray tubes for visually displaying on said tubes in adjacent scan lines the output pulses of said storage means, and means for stereoscopically viewing the displays on said cathode ray tubes.

4. In combination with apparatus which forms a sequentially occurring series of visual representations of the position and reflectivity of a plurality of elemental areas which collectively represent a strip of terrain, apparatus for generating a pair of stereoscopically related images representing an area of said terrain as viewed from different points, comprising, two spaced television cameras each for viewing said representations from different viewpoints and forming images on the sensitive area thereof, deflection circuit means for each respective camera for causing the respective camera to scan its respective sensitive area with a series of radial scan lines, the apex of said scan lines of each of said cameras being located at a different point with respect to the representations viewed, one series of said radial scan lines occurring in the time required to form one of said visual representations, each of said cameras including means for providing a series of output pulses the time of occurrence of each of which represents the direction and distance from the apex of the corresponding point of said image so formed and the amplitude of which represents intensity, two peak reading circuits, one connected to the output of each camera, for generating a series of pulses occurring at times corresponding to the end of each radial scan line and representing the distance of the corresponding elemental area and, the amplitude of each of which corresponds to the amplitude of the corresponding pulse generated by the corresponding camera and represents the reflectivity of the corresponding elemental area, two storage means, one connected to the output of each of said peak reading circuits, each said storage means for storing pulses at the rate of their occurrence and for reading out the stored pulses at a different rate, and two cathode ray tubes, one connected to the output of each of said storage means, each said cathode ray tube for generating a visual display, each said display comprising a series of adjacent lines, each said line representing the pulses generated by one of said series of radial scan lines.

References Cited

UNITED STATES PATENTS

| | | | |
|---|---|---|---|
| 2,301,254 | 11/1942 | Carnahan | 178—6.5 |
| 2,307,188 | 1/1943 | Bedford. | |
| 2,611,126 | 9/1952 | Irving | 315—29 X |
| 2,798,115 | 7/1957 | Wiens | 178—6.5 |
| 2,857,553 | 10/1958 | King | 315—24 |
| 2,995,678 | 8/1961 | Taylor et al. | 315—24 |
| 3,019,292 | 1/1962 | John | 178—6.8 X |
| 3,153,699 | 10/1964 | Plass | 178—6.8 |
| 3,175,121 | 3/1965 | Birnbaum et al. | 315—23 |

FOREIGN PATENTS

| | | |
|---|---|---|
| 907,540 | 10/1962 | Great Britain. |

JOHN W. CALDWELL, *Acting Primary Examiner.*

R. L. RICHARDSON, *Assistant Examiner.*